(12) United States Patent
Vargantwar (10) Patent No.: US 8,270,979 B1
(45) Date of Patent: Sep. 18, 2012

(54) METHODS AND SYSTEMS FOR FACILITATING HANDOFF

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 125 days.

(21) Appl. No.: 12/943,289

(22) Filed: Nov. 10, 2010

(51) Int. Cl.
*H04Q 7/20* (2006.01)

(52) U.S. Cl. ......... 455/438; 455/439; 455/436; 370/331

(58) Field of Classification Search ................ 455/438, 455/439, 436; 370/331
See application file for complete search history.

(56) References Cited

U.S. PATENT DOCUMENTS

| | | | |
|---|---|---|---|
| 6,360,098 B1 * | 3/2002 | Ganesh et al. | 455/436 |
| 6,438,376 B1 * | 8/2002 | Elliott et al. | 455/437 |
| 6,754,493 B1 * | 6/2004 | Jetzek | 455/436 |
| 7,110,766 B1 * | 9/2006 | Tayloe et al. | 455/438 |
| 7,421,271 B2 * | 9/2008 | Kong et al. | 455/436 |
| 2008/0113670 A1 | 5/2008 | Dufour et al. | |
| 2008/0118574 A1 * | 5/2008 | Mueller et al. | 424/632 |
| 2009/0073936 A1 * | 3/2009 | Jentz et al. | 370/331 |
| 2010/0260089 A1 * | 10/2010 | Lin et al. | 370/312 |
| 2012/0003959 A1 * | 1/2012 | Gonzalez-Canedo et al. | 455/411 |

* cited by examiner

Primary Examiner — Danh Le (57) ABSTRACT

Methods and systems for facilitating handoff in a wireless communication network are disclosed. One method entails receiving a sector handoff request from a mobile station, the request including a signaling trend and specifying a sector identifier that identifies a target sector, where multiple available sectors are identified by the sector identifier. The method further entails accessing a history of signaling-trend records, which are indexed per sector, to determine, based on the received signaling trend, which of the multiple available sectors is the intended target sector, and, responsive to the determination of the intended target sector, causing the mobile station to be served by the intended target sector. Other embodiments include a system for implementing the methods and a method in which a mobile station requests handoff to a target sector and provides a signaling trend upon request when it is determined that multiple available sectors have the same sector identifier.

20 Claims, 5 Drawing Sheets

METHODS AND SYSTEMS FOR FACILITATING HANDOFF

BACKGROUND

To provide cellular wireless communication service, a wireless service provider typically operates a radio access network (RAN) that defines one or more wireless coverage areas, in which mobile stations can be served by the RAN and can thereby communicate with other mobile stations and obtain connectivity with broader networks such as the public switched telephone network (PSTN) and the Internet.

A typical RAN may include one or more base transceiver stations (BTSs) (e.g., macro network cell towers or femtocells), each of which may radiate to define one or more wireless coverage areas such as cells and cell sectors in which wireless mobile stations (MSs) can operate. "Sector" will be used hereinafter to refer generally to any wireless coverage area. Further, the RAN may include one or more base station controllers (BSCs), radio network controllers (RNCs) or the like, which may be integrated with or otherwise in communication with the BTSs and may include or be in communication with a switch or gateway that provides connectivity with one or more transport networks. Conveniently with this arrangement, a cell phone, personal digital assistant, wirelessly equipped computer, or other mobile station (whether or not actually operated by a user) that is positioned within coverage of the RAN can then communicate with a BTS and in turn, via the BTS, with other served devices or with other entities on the transport network.

In general, a RAN will communicate with served mobile stations according to an agreed air interface protocol, examples of which include CDMA (E.G., 1xRTT or 1xEV-DO), iDEN, WiMAX, LTE, TDMA, AMPS, GSM, GPRS, UMTS, or EDGE, and others now known or later developed. Communications in the direction from the RAN to mobile stations define a "forward link," while those in the direction from mobile stations to the RAN define a "reverse link."

A typical air interface protocol will provide a mechanism to distinguish communications in one sector from those in adjacent sectors and to distinguish between communications within a given sector. Under some air interface protocols, for instance, each sector may have a sector identifier that distinguishes the sector from adjacent sectors, and communications in the sector may designate or be encoded with that sector identifier in order to distinguish the communications from those in adjacent sectors. Likewise, each air interface connection (e.g., communication channel or other assigned connection resource) in a sector may have by a radio-link identifier, and communications carried on that connection may designate or be encoded with that radio-link identifier in order to distinguish the communications from others in the sector.

For example, under the CDMA 1xRTT protocol, each sector has a locally unique pseudonoise offset ("PN offset") that is used to encode communications in the sector in a manner that distinguishes from communications in adjacent sectors, and each sector defines various control channels and traffic channels that are each encoded with a respective "Walsh code." As another example, under the CDMA 1xEV-DO protocol, each sector similarly has a PN offset that distinguishes communications in the sector from those in adjacent sectors, and each sector designates connections assigned to various mobile stations by respective "MAC Indexes" (which may translate to Walsh codes similarly used to encode communications). Other examples are possible as well.

A RAN will typically broadcast a pilot signal respectively in each sector, to enable mobile stations to detect and evaluate cellular coverage. Further, the pilot signal of each sector may embody or designate the sector identifier, so that mobile stations can determine which sector is emitting the pilot signal. Under CDMA, for instance, the RAN may broadcast in each sector a pilot signal encoded with the sector's PN offset, so that if a mobile station detects a pilot signal encoded with that PN offset, the mobile station may determine that the PN offset is the sector identifier of the sector that is emitting the pilot signal.

The RAN may broadcast other status or informational messages on a sector-by-sector basis as well that a mobile station within or near a particular sector could receive. For instance, according to EV-DO protocol, a sector may track its reverse noise, that is, the degree of activity that the sector is receiving, and may set or clear a Reverse Activity Bit (RAB) depending upon whether the reverse noise is above or below a given baseline. A sector may determine its RAB once every 1.67 milliseconds, the frequency at which it may transmit forward-link timeslots, or at another frequency. After determination of the RAB, the sector may broadcast the RAB as a stand alone message or embedded within another message.

A sector may broadcast other status or informational messages to mobile stations within or near the sector. As one example, each sector may maintain a "neighbor list" that lists sectors neighboring (adjacent to or otherwise nearby), designating each neighboring sector by its sector identifier. The sector may broadcast neighbor list messages so that mobile stations could receive list the neighboring sectors or updates to the sector's neighbor list. As further examples, a sector may broadcast sector parameter messages, access parameter messages, or conflict messages to those mobile stations within or near the sector. A sequence or series of RAB or other status or informational messages may be described as a "signaling trend."

In an "idle" or "dormant" state where a mobile station is not actively engaged in a call or other communication session, the mobile station may regularly monitor the strength (e.g., signal-to-noise ratio (SNR)) of various pilot signals in search of a strongest pilot signal and thus a best sector in which to operate. If and when the mobile station subsequently seeks to initiate a communication session, the mobile station may send a connection request (e.g., origination request) on an access channel of the selected sector, requesting the RAN to assign or otherwise establish a connection for the session. In response, the RAN may then assign a particular radio-link identifier (e.g., traffic channel or connection identifier, such as Walsh code or MAC Index) to the mobile station to be used in the sector, thereby transitioning the mobile station to an "active" state.

In the active state, when the mobile station is operating with an assigned connection in a given sector, the mobile station may regularly monitor the strength (e.g., SNR) of the pilot signal in that sector and the strengths of the pilot signals in neighboring sectors. If the pilot signal from another sector becomes sufficiently stronger than the pilot signal from the current serving sector (e.g., as a result of the mobile station moving toward the adjacent sector), the mobile station may then engage in control channel signaling with the RAN to arrange for a handoff of the communication session from the current sector to the other sector.

Under certain air interface protocols, such as CDMA for instance, a mobile station can operate actively in more than one sector at a time. Such an arrangement helps when the mobile station passes through an area of overlap between two or more sectors, as the mobile station may then engage in a "soft handoff" process that involves switching to communicate in a new sector before discontinuing communication in a previous sector. Further, soft handoff provides other advantages, such as allowing the mobile station or the RAN to combine together or select the best quality of communications carried out simultaneously in the multiple sectors.

To facilitate soft handoff, a mobile station may maintain in its memory an "active set" that lists the sectors in which the mobile station has an active connection, and the RAN may likewise maintain a record of the mobile station's active set and will communicate with the mobile station in each listed sector. The active set may designate each sector by its sector identifier and may further designate the connection assigned to the mobile station in that sector by its radio-link identifier. Generally, an active set may be limited in size to some defined number of sectors, such as three or six for instance.

In practice, the RAN may also provide the mobile station with a "neighbor list" that lists sectors neighboring (adjacent to or otherwise nearby) those in the mobile station's active set, designating each neighboring sector by its sector identifier. The mobile station may then regularly evaluate the strength of pilot signals emitted by each sector of its active set and the strength of pilot signals emitted by each sector listed in the neighbor list, as well as the strength of other (remaining) pilot signals that the mobile station detects even if not listed in the mobile station's active set or neighbor list. If the mobile station thereby detects a pilot signal that is sufficiently strong compared with the weakest of the mobile station's active set members, the mobile station may then engage in signaling with the RAN to arrange for soft handoff to the detected sector and perhaps removal of the weaker sector from the mobile station's active set.

When a mobile station begins a communication session, the mobile station's active set may consist of just the sector in which the mobile station sent its connection request. At that point, the BTS serving that sector may provide the mobile station with a neighbor list designating neighbors of that one sector. As the communication session proceeds, the mobile station may then detect other sectors and arrange for addition of those other sectors to its active set through soft handoff.

Alternatively, a session can be initiated through a process known as "channel assignment into soft handoff" (CASHO), where the mobile station begins the session in a soft handoff state (having multiple sectors in its active set) rather than transitioning to that state over time in the session. In the CASHO process, the mobile station identifies multiple candidate sectors to initially include in its active set and, when requesting a connection in a particular sector, the mobile station provides the serving BTS with a list of the identified sectors (each designated by sector identifier). The RAN may then establish a connection for the mobile station respectively in each identified sector, so that the mobile station can begin the communication session in a soft handoff state, active in multiple sectors at once.

Overview

In some situations, a mobile station may ask to operate in a sector that the mobile station designates by a particular sector identifier (e.g., a PN offset or other identifier) but the RAN may not know with certainty which sector the mobile station means. This can happen, for instance, in a soft handoff situation where a mobile station detects a sufficiently strong pilot that embodies or designates a sector identifier but where that identifier is not listed in a neighbor list of the mobile station's current serving sector, and where there are at least two sectors in the vicinity that have that sector identifier.

For instance, if a mobile station sends a handoff request to its serving sector A and specifies sector identifier B as the identifier of a target sector, an ambiguity may arise if sector identifier B is not listed in the neighbor list of sector A and if there are multiple sectors in the vicinity that have sector identifier B. Likewise, if a mobile station is currently active in sectors A, B, and C, and sends a handoff request designating sector identifier D as a handoff target, an ambiguity may arise if sector identifier D identifies multiple sectors in the combined neighbor list of sectors A, B, and C. An ambiguity may also arise if sector identifier D is not listed in the neighbor list of any of sectors A, B, and C, but there are multiple sectors in the vicinity that have sector identifier D.

If the RAN determines that multiple sectors in the vicinity have the sector identifier specified by the mobile station and if the sector identifier is not listed in an applicable neighbor list, the RAN may try to determine which of the sectors is most likely the one from which the mobile station received a pilot signal that triggered the mobile station's handoff request. For instance, the RAN may consider base station antenna locations and directions of radiation in relation to the location of the mobile station, or the RAN may consider other factors. Ultimately, the RAN may thereby select a sector that the RAN concludes is the one intended by the mobile station's designation of the sector identifier. Alternatively, even without detecting the fact that there are multiple sectors in the vicinity that have the specified sector identifier, or without noting the absence of the sector identifier from an applicable neighbor list, the RAN may conclude that the specified sector identifier designates a particular sector in the vicinity.

Unfortunately, however, in these or other situations, the RAN may err in its determination of which sector the mobile station intended to designate when the mobile station specified the sector identifier. For instance, in the first example above, given two sectors 1 and 2 in the vicinity that each have sector identifier B, the mobile station may have received the threshold strong pilot signal in sector 1, but the RAN may somehow conclude that the mobile station was designating sector 2.

When this error occurs, the RAN may hand off the mobile station to the wrong sector. In particular, extending the example above, the mobile station would have assumed that the new serving sector is sector 1, but the RAN would have actually assigned the mobile station to sector 2. As a result of that assignment, the quality of the mobile station's communications could degrade. For instance, sector 1, the target sector intended by the mobile station in the handoff request, may have had a strong pilot signal, but sector 2, the actually assigned sector, may have had a weak pilot signal. In assigning the mobile station to sector 2, therefore, the RAN would cause the mobile station to communicate on a sector that likely cannot support high quality communication, whereas if the mobile station had been handed off to sector 1, that would not have been the case. If the system configuration only allowed the mobile station to be served by a single sector at a time, the original serving sector's coverage of the mobile station would have been terminated during the handoff, and the mobile station would be left with the undesirable level of coverage provided by sector 2, possibly resulting in a dropped call.

Disclosed herein are methods and corresponding systems to help avoid this problem. In an exemplary system, a RAN comprises a plurality of base stations that radiate to define a plurality of sectors. The RAN further comprises a processor and data storage. The data storage contains instructions executable by the processor for causing the RAN to carry out multiple functions. The functions include receiving, from a mobile station, a sector handoff request, including a sector identifier identifying an intended target sector and a signaling trend. Multiple available sectors in the plurality of sectors have the sector identifier. The functions further include accessing a history of signaling-trend records, indexed per sector, to determine, based on the received signaling trend, which of the multiple available sectors is the intended target sector. The functions still further include causing, responsive to the determination of the intended target sector, the mobile station to be served by the intended target sector.

In one exemplary method, which may be performed by a RAN, the RAN receives a sector handoff request from a mobile station. The sector handoff request specifies a sector identifier, which identifies an intended target sector, and a signaling trend. In the RAN, multiple available sectors are identified by the sector identifier. After receiving the handoff request, the RAN accesses a history of signaling-trend records, indexed per sector, to determine, based on the received signaling trend, which of the multiple available sectors is the intended target sector. Responsive to the determination of the intended target sector, the RAN causes the intended target sector to serve the mobile station.

In another exemplary method, which may also be performed by a RAN, the RAN receives from a mobile station a handoff request that identifies an intended target sector by a target sector identifier. The RAN then determines that multiple available sectors have the target sector identifier. Responsive to that determination, the RAN queries the mobile station for a signaling trend from the intended target sector and receives the signaling trend in response from the mobile station. The RAN then determines the intended target sector from among the multiple available sectors based upon the received signaling trend. The RAN then causes the determined target sector to serve the mobile station.

These as well as other aspects, advantages, and alternatives will become even more apparent to those skilled in the art by reading the following detailed description with reference where appropriate to the accompanying drawings. Further, it should be understood that the description throughout this document, including in this overview, is intended to illustrate the present methods and systems by way of example only and not by way of limitation.

DETAILED DESCRIPTION

Figure 1:
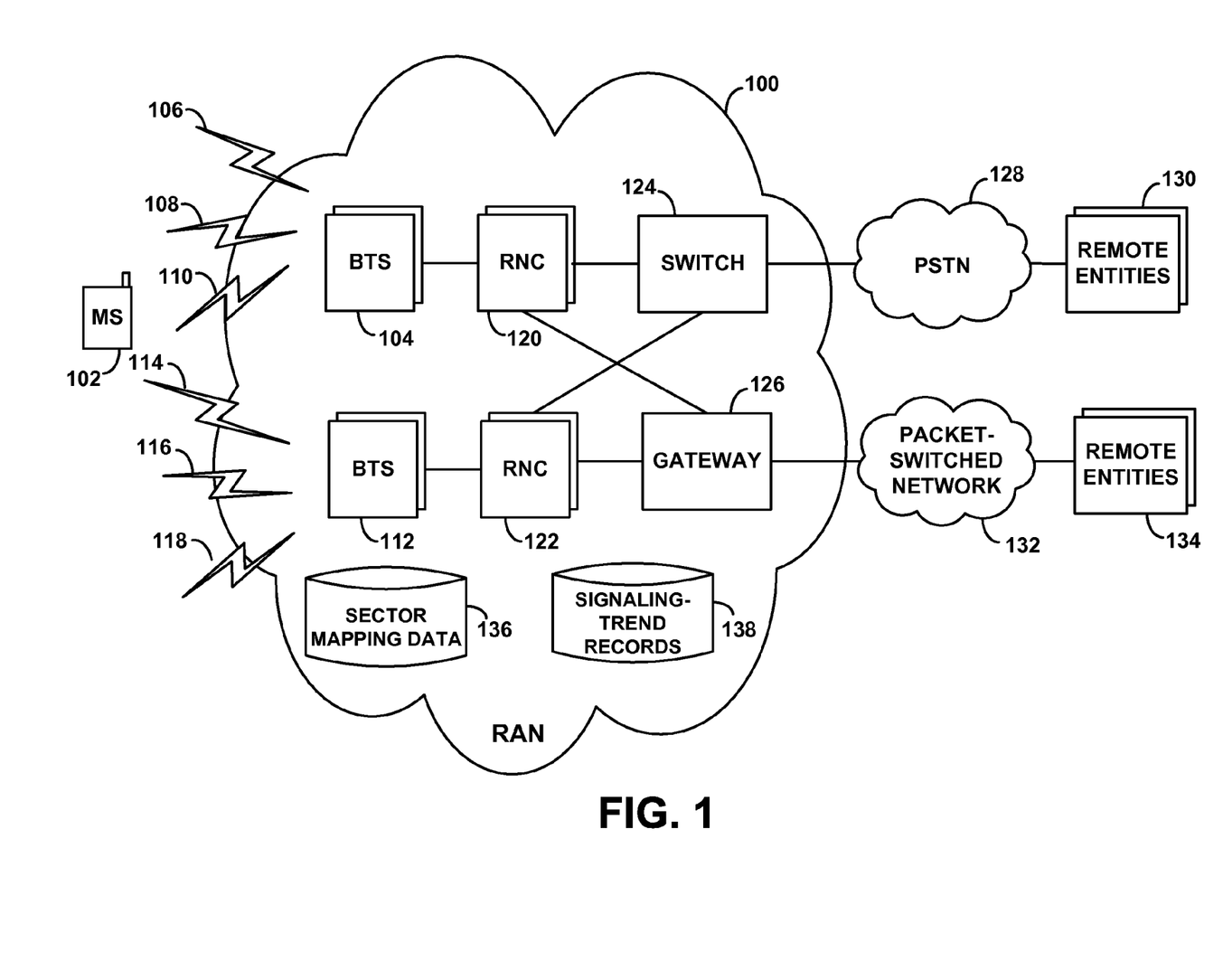
FIG. 1 is a simplified block diagram of a communication system in which exemplary methods can be implemented.

Referring to the drawings, FIG. 1 depicts a cellular communication system in which aspects of an exemplary method can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine language instructions stored in data storage and executed by a processor), firmware, or hardware.

As shown in FIG. 1, the example communication system includes at its core a RAN 100 that is arranged to provide multiple mobile stations with wireless communication service. FIG. 1 depicts a representative mobile station 102 by way of example, which could be a cell phone, access terminal, wirelessly equipped PDA, or other type of wirelessly-equipped device now known or later developed. Each mobile station is equipped with hardware, software, and other logic to communicate with RAN 100 in accordance with an agreed air interface communication protocol, such as CDMA (e.g., 1xRTT, 1xEV-DO, etc.), iDEN, WiMAX, TDMA, AMPS, GSM, GPRS, UMTS, EDGE, LTE, or any other communication protocol now known or later developed.

RAN 100 includes one or more BTSs that radiate to define a plurality of sectors in which mobile stations can communicate with the RAN. As one example, BTS 104 radiates to define sectors 106, 108, and 110. As another example, BTS 112 radiates to define sectors 114, 116, and 118. The BTSs may define these sectors discretely through use of directional antennas or by various modulation parameters, including, without limitation, carrier frequencies and PN offsets or other parameters, depending on the air interface protocol used.

In an example implementation, each sector will have a sector identifier that distinguishes the sector from adjacent sectors. Further, each sector is arranged to support multiple radio links or connections, distinguished from each other by radio-link identifiers (e.g., Walsh codes, MAC Indexes, or other identifiers). When a mobile station operates in a given sector, forward link communications from the BTS to the mobile station may be carried on a given frequency and may designate or embody the sector's sector identifier and possibly an applicable radio-link identifier.

In a CDMA 1xRTT system, for instance, each sector operating on a given carrier frequency will have a respective PN offset, and each forward link air interface channel in the sector will have a respective Walsh code, such that multiple Walsh coded channels may exist concurrently. To transmit communications on a given channel in a particular sector, the RAN will thus encode (e.g., spread spectrum modulate) the communications using the sector's PN offset and the channel's Walsh code and will transmit the resulting communications on the sector's carrier frequency. Correspondingly, a mobile station that is arranged to receive on that channel will tune to the carrier frequency and demodulate communications using sector's PN offset and the channel's Walsh code.

In this manner, a mobile station may receive and evaluate signals corresponding to particular sectors transmitted by the RAN. For example, the mobile station may receive and evaluate a pilot signal that the RAN transmits in the sector on a particular Walsh code. Further, the RAN may assign the mobile station a Walsh code for a traffic channel, and the RAN may then communicate bearer traffic to the mobile station on that traffic channel, encoded with the assigned Walsh code. As another example, the mobile station may receive and evaluate status or informational messages for particular sectors. Such signals may include RABs, sector parameter messages, neighbor list update messages, access parameter messages, conflict messages, or other signaling messages specific to a sector. Mobile stations and other network entities may record signaling trends of particular sectors by recording these messages.

Returning to FIG. 1, BTS 104 is shown coupled with RNC 120, and BTS 112 is shown coupled to RNC 122. RNCs 120 and 122 are shown coupled with a switch 124 and a gateway 126. The switch 124 is then shown providing connectivity with the PSTN 128 so as to facilitate communication with remote entities 130, and the gateway 126 is shown providing connectivity with a packet-switched network 132 such as the Internet so as to facilitate communication with other remote entities 134. RNCs 120 and 122 are shown as sharing a switch and a gateway, but they could just as easily be coupled to different switches and different gateways.

In typical practice, each RNC may control one or more BTSs and may work with the BTSs to manage aspects of air interface operation such as assignment of radio-link identifiers, handoff between sectors, and power control. Further, the switch or gateway may work with the RNCs to manage various aspects of RAN operation as well. Ultimately, the extent to which various RAN functions are carried out by an RNC, a BTS, a switch, a gateway, or one or more other RAN components may vary from implementation to implementation and is therefore not critical to an understanding or definition of the present methods and systems.

When a mobile station sends a connection request in a sector, the BTS serving that sector may then forward the connection request to the RNC, and, upon approval by the RNC or switch, the BTS may arrange for the mobile station to operate on that sector and may notify the RNC or switch of the arrangement. When a mobile station in a serving sector sends a handoff request specifying a target sector, the BTS serving the serving sector may then forward the handoff request to the RNC, and, upon approval by the RNC or switch, the BTS may arrange for the mobile station to operate on the target sector alone, or on both the serving sector and the target sector, and may notify the RNC or switch of the arrangement. The BTS and RNC or switch may then update their respective records for the mobile station. In turn, when a mobile station's operation on a sector is terminated, the BTS and the RNC or switch may revise their records to show that the mobile station is no longer operating on the sector.

The BTS may also be configured to conduct a distance search of sectors within a given radius, either on its own or in conjunction with the RNC and the switch. For example, the BTS (or the RNC or the switch) may maintain lists of sectors and those sectors' respective distances from the BTS. To conduct a distance search, the BTS may then access the list to determine which sectors fit within the distance criterion. The BTS may update the list when the network configuration changes such that new sectors are created or old sectors disappear or move. Alternatively, the BTS may query the switch, through the RNC, to determine what sectors are within a given radius of the BTS. The switch may then query other BTSs to determine which sectors are within that radius, and return a list of sectors to the BTS.

Returning to FIG. 1, RAN 100 may maintain and access sector mapping data 136. The sector mapping data may designate various sectors by sector identifier and may specify various data regarding the location and scope of each sector. For instance, the data may specify for each sector a location of the sector, such as a location of the BTS that radiates to define the sector, a likely geographic scope of the sector, and other data regarding the sector. The data may also specify which mobile stations are currently operating in a sector. This data may be established through querying various BTSs, field testing, or other means. Further, the data could be maintained in one or more of the illustrated RAN components, maintained in a database outside the RAN, or replicated throughout the RAN.

RAN 100 may maintain and access signaling-trend records 138. The signaling-trend records may include records on every sector within the RAN or only on a subset of sectors within the RAN. The signaling-trend records may be indexed by sector and may record each sector's signaling history. For instance, the signaling-trend records may include a time-stamped history of a given sector's RABs. The signaling-trend records may also include time-stamped histories of each sector's sector parameter messages, access parameter messages, conflict messages, neighbor list messages, or any combination or subset of such messages. In addition to being indexed by sector, the signaling-trend records could be indexed by signaling-trend identifier, for example having each sector's records arranged according to message type. The signaling-trend records may be established through querying various BTSs, passively recording BTS transmissions, or other means. Further, the signaling-trend records could be maintained in one or more of the illustrated RAN components, maintained in a database outside the RAN, or replicated throughout the RAN.

The signaling-trend records may be limited to recent signaling trends. For example, the signaling-trend records may only include message or signaling histories from the recent past, such as those that were transmitted within some set number of seconds or minutes. As another example, signaling-trend records may only include a set number of messages of a given signaling-trend identifier, e.g., only including a sector's last ten or a hundred RABs. Such a temporal or quantitative limit on the signaling-trend records could mitigate the cost of data storage for the signaling-trend records to the provider of the RAN.

Various components of a RAN can work alone or in combination to carry out functions of the present method. Which components are involved may depend on the particular network arrangement and air interface protocol used. As noted above, for instance, aspects of the method can be carried out by a BTS, an RNC, a switch, or one or more other RAN components.

Turning to the flow chart figures, there are two basic exemplary methods. In the first exemplary method, described with reference to FIG. 2, the mobile station requests a handoff and is then prompted by the RAN to provide a signaling trend for use by the RAN to determine to which of multiple available sectors the mobile station intended to be handed off. In the second exemplary method, described with reference to FIGS. 3 and 4, the mobile station provides a signaling trend in an initial handoff request, and the RAN then uses the signaling trend to determine to which of multiple available sectors the mobile station intended to be handed off.

Figure 2:
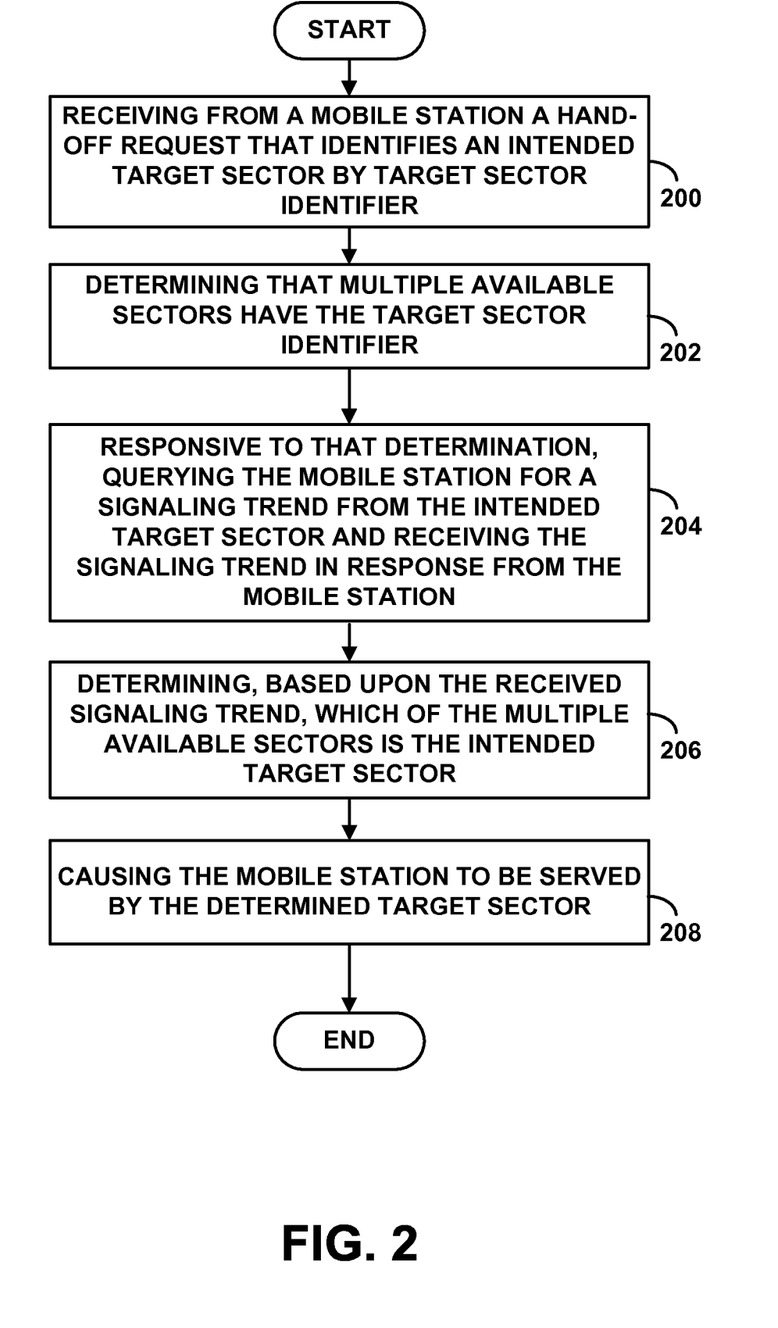
FIG. 2 is a flow chart depicting functions that can be carried out in accordance with an exemplary method.

Beginning with FIG. 2, FIG. 2 depicts some of these functions that can be carried out by one or more RAN components in accordance with an exemplary method. The arrangement of functions shown in FIG. 2 is exemplary and non-limiting. These functions could be re-ordered, combined, divided, or omitted, as appropriate for a particular implementation. For illustrative purposes, reference will be made to the entities and arrangements of FIG. 1 in the discussion of FIG. 2, but it should be understood that other entities and arrangements are possible.

To set the stage for the FIG. 2 discussion, returning briefly to FIG. 1, mobile station 102 may be currently served by sector 110 radiated by BTS 104. All the sectors radiated by BTS 104 (sectors 106, 108, and 110) may have distinct sector identifiers and may be on each other's neighbor lists. But sector 108 may share a sector identifier with sector 114, radiated by BTS 112. Sector 114 may not be on the neighbor list of sector 110. In this example, sector 108 and sector 114 both have a sector identifier that is a PN offset of 20.

Mobile station 102 may be monitoring and recording messages, such as pilot signal strength and other status and informational messages, from sectors other than serving sector 110. For instance, mobile station 102 may be monitoring and recording pilot signal strength messages from sector 114 and may identify sector 114 as a suitable serving sector based on the pilot signal strength of sector 114. Therefore, mobile station 102 may attempt to cause a handoff to sector 114.

At block 200 in FIG. 2, BTS 104 receives from mobile station 102 a handoff request that identifies an intended target sector by a target sector identifier. Here, in its handoff request, mobile station 102 specifies a PN offset of 20 as the target sector identifier, in an attempt to identify sector 114.

BTS 104, at block 202, determines that multiple available sectors have the target identifier. When multiple sectors share a sector identifier provided in a handoff request, BTS 104 may not know to which of the sectors that mobile station 102 intends to be handed off. BTS 104 may access sector mapping data 136 to determine that both sector 108 and sector 114 have the same target identifier: a PN offset of 20. Responsive to that determination, at block 204, BTS 104 queries mobile station for a signaling trend from the intended target sector.

In one embodiment, BTS 104 may include in its query to mobile station 102 a time limit for mobile station 102 to respond to the query. Mobile station 102 may be traveling at a given speed, and mobile station 102 may have indicated that speed in a message sent to BTS 104, or BTS 104 may have calculated that speed. BTS 104 may establish the time limit for a response to the signaling-trend query based upon the speed of mobile station 102. For instance, if mobile station 102 is traveling at a relatively high speed, BTS 104 may set a relatively short time limit, so as to try to effect the handoff quickly and before mobile station 102 moves into the geographic areas of a different subset of sectors.

After receiving the query from BTS 104, mobile station 102 may monitor and record signaling from sector 114 to obtain a signaling trend. For example, mobile station 102 may monitor and record RABs broadcast by sector 114 over a set interval, such as tens or hundreds of milliseconds. Specifically, mobile station 102 may record the values of every RAB that it receives from sector 114 during the set interval. The RAB signaling trend may include the start and end time of the RABs that it includes, or may include some other indication of when those RABs were broadcast or received.

As another example, mobile station 102 may monitor and record neighbor list messages, access parameter messages, sector parameter messages, or conflict messages from sector 114 over a set interval or until a set number of messages of a particular type are broadcast. For instance, mobile station may record the most recent few neighbor list messages that it receives from sector 114 and the times at which those message were received. The signaling trend may then be those neighbor list messages, each time-stamped.

As yet another example, mobile station 102 may have been monitoring and recording signaling from sector 114 prior to receiving the query from BTS 104. In that situation, mobile station 102 may only need to access its own signaling records to retrieve the signaling trend for BTS 104.

After recording the signaling trend, mobile station 102 may send the signaling trend to BTS 104 to identify sector 114 as the intended target sector.

At block 204, BTS 104 receives the recorded signaling trend from mobile station 102. Based on the received signaling trend, BTS 104, at block 206, then determines which of the multiple available sectors is the intended target sector. Both sector 108 and sector 114 are available target sectors.

Because both sector 108 and sector 114 have sector identifiers matching that specified by mobile station 102, BTS 104 may access the signaling-trend records 138 of sectors 108 and 114 to determine which of those sectors has a signaling trend that matches the signaling trend reported by mobile station 102. For example, if the received signaling trend consists of the ten most recent RABs from sector 114, BTS 104 may access the ten most recent RABs from each of sector 108 and sector 114 in signaling-trend records 138. BTS 104 may then compare the received RAB signaling trend with the RAB signaling trends retrieved from the signaling-trend records. In determining that sector 114 is the intended target sector, BTS 104 may determine that the RAB signaling trend for sector 114 matches or substantially matches the received RAB signaling trend and that the RAB signaling trend for sector 108 does not match or does not substantially match the received RAB signaling trend.

As another example, if the received signaling trend consists of the most recent conflict message from sector 114, BTS 104 may access the most recent conflict message from each of sector 108 and sector 114 in signaling-trend records 138. BTS 104 may then compare the received conflict message signaling trend with the conflict message signaling trends retrieved from the signaling-trend records. In determining that sector 114 is the intended target sector, BTS 104 may determine that the conflict message signaling trend for sector 114 matches or substantially matches the received conflict message signaling trend and that the conflict message signaling trend for sector 108 does not match or does not substantially match the received conflict message signaling trend.

After determining that sector 114 is the intended target sector, at block 208, BTS 104 causes mobile station 102 to be served by sector 114. As one example, BTS 104 may effect the handoff to sector 114 by engaging in handoff signaling involving RNC 120, switch 124, RNC 122, and ultimately BTS 112, which radiates to define sector 114. Specifically, BTS 104 may send a handoff request that is received by BTS 112. BTS 112 may then arrange for sector 114 to serve mobile station 102 and send a message to BTS 104 indicating that sector 114 serves mobile station 102. After the handoff to sector 114, mobile station 102 may terminate its operations on serving sector 110 or may proceed to operate on both sector 110 and sector 114.

In some embodiments, after handoff, mobile station 102 may be served by both originally serving sector 110 and target sector 114. Examples of these embodiments are the handoff request being a request for a soft handoff, or the handoff request being a CASHO request.

Figure 3:
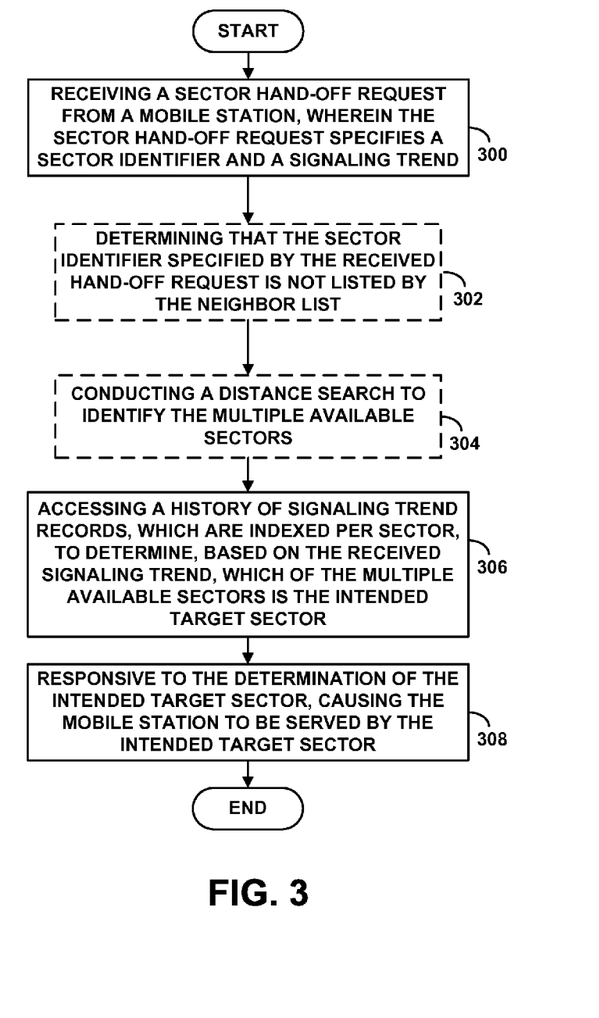
FIG. 3 is a flow chart depicting functions that can be carried out in accordance with another exemplary method.

Turning to FIG. 3, FIG. 3 depicts some of these functions that can be carried out by one or more RAN components in accordance with another embodiment of the present method. The arrangement of functions shown in FIG. 3 is exemplary and non-limiting. These functions could be re-ordered, combined, divided, or omitted, as appropriate for a particular implementation. For illustrative purposes, reference will be made to the entities and arrangements of FIG. 1 in the discussion of FIG. 3, but it should be understood that other entities and arrangements are possible.

To set the stage for the FIG. 3 discussion, again returning briefly to FIG. 1, mobile station 102 may be currently served by sector 110 radiated by BTS 104. As noted above, all the sectors radiated by BTS 104 (sectors 106, 108, and 110) may have distinct sector identifiers and may be on each other's neighbor lists. Sector 114 may not be on the neighbor list of sector 110. The sector identifier of 114 may be a PN offset of 20, and sectors 106, 108, 110 may each have a different PN offset value as a sector identifier. Sector 118 may share a PN offset of 20 as a sector identifier with sector 114.

Mobile station 102 may be monitoring and recording messages, such as pilot signal strength and other status and informational messages, from sectors other than serving sector 110. For instance, mobile station 102 may be monitoring and recording messages from sector 114 and may identify sector 114 as a suitable serving sector. In the process of determining sector 114 is a suitable serving sector, mobile station 102 may monitor and record a signaling trend from sector 114. As noted above, mobile station 102 may monitor and record RABs broadcast by sector 114 over a set interval, such as tens or hundreds of milliseconds. As another example, mobile station 102 may monitor and record neighbor list messages, access parameter messages, sector parameter messages, or conflict messages from sector 114 over a set interval or until a set number of messages of a particular type are broadcast. In response to its monitoring of sector 114, mobile station 102 may attempt to cause a handoff to sector 114.

At block 300 in FIG. 3, BTS 104 receives from mobile station 102 a handoff request that identifies an intended target sector by a target sector identifier and includes a signaling trend. Here, in its handoff request, mobile station 102 specifies a PN offset of 20, as the target sector identifier, and the recorded signaling trend from sector 114.

The reported signaling trend may include a sequence of messages from the intended target sector and a signaling trend identifier. For example, mobile station 102 may record RABs from sector 114, and in addition to including the recorded RAB signaling trend in its handoff request, mobile station 102 may also identify the trend as being of a RAB type in the handoff request. The signaling trend identifier may allow BTS 104 to understand what type of signaling trend mobile station 102 recorded and reported.

Blocks 302 and 304 depict optional functions that may be performed separately or together in alternate embodiments of the method otherwise depicted in FIG. 3. At block 302, BTS 104 determines that the sector identifier specified by the handoff request received from mobile station 102 is not listed by the neighbor list of the sector currently serving the mobile station. Here, BTS 104 may examine the neighbor list of sector 110, which currently serves mobile station 102, to determine that neither of the sectors on the neighbor list, sectors 106 and 108, have the specified target sector identifier, a PN offset of 20.

At block 304, BTS 104 may conduct a distance search to identify multiple available sectors having the target sector identifier. BTS 104 may conduct the distance search in response to the determination that sector 114 is not in the neighbor list of sector 110, in order to determine which sector outside that neighbor list mobile station 102 intends to be handed off to. BTS 104 may conduct the distance search by accessing a list of sectors that BTS 104 maintains that lists sectors along with each sector's distance away from BTS 104 and by identifying the sectors on the list within a given distance, such as 10 miles. Alternatively, BTS 104 may query switch 124 for sectors within a given distance from BTS 104, and switch 124 may then query other BTSs to return a list of sectors to BTS 104. From the results of the distance search, BTS 104 may identify sectors 114 and 118, which are both within a given distance of BTS 104 and both have the target sector identifier.

At block 306, BTS 104 accesses a history of signaling-trend records, which are indexed per sector, to determine, based on the signaling trend received from mobile station 102, which of the multiple available sector is the intended target sector. Both sector 114 and sector 118 are available target sectors. (In embodiments in which the functions at blocks 302 and 304 are not carried out, BTS 104 may have identified both sector 114 and sector 118 by accessing sector mapping data 136 and ascertaining thereby their respective sector identifiers.)

BTS 104 may access the signaling-trend records 138 of sectors 114 and 118 to determine which is the intended target sector. For example, if the received signaling trend consists of the ten most recent RABs from sector 114, BTS 104 may access the ten most recent RABs from each of sector 114 and sector 118 in signaling-trend records 138. BTS 104 may then compare the received RAB signaling trend with the RAB signaling trends retrieved from the signaling-trend records. In determining that sector 114 is the intended target sector, BTS 104 may determine that the RAB signaling trend for sector 114 matches or substantially matches the received RAB signaling trend and that the RAB signaling trend for sector 118 does not match or does not substantially match the received RAB signaling trend.

As another example, if the received signaling trend consists of the most recent conflict message from sector 114, BTS 104 may access the most recent conflict message from each of sector 118 and sector 114 in signaling-trend records 138. BTS 104 may then compare the received conflict message signaling trend with the conflict message signaling trends retrieved from the signaling-trend records. In determining that sector 114 is the intended target sector, BTS 104 may determine that the conflict message signaling trend for sector 114 matches or substantially matches the received conflict message signaling trend and that the conflict message signaling trend for sector 118 does not match or does not substantially match the received conflict message signaling trend.

In the embodiment in which the handoff request includes a signaling trend identifier, BTS 104 may use the signaling trend identifier to access the relevant signaling-trend records among signaling-trend records 138. For instance, BTS 104 may access all of the signaling-trend records associated with sector 114 and 118, and those records may consist of different types of signaling trends. To isolate those records that are relevant, BTS 104 may select the records having the same type as the signaling trend identifier. Therefore, BTS 104 may compare, for example, the RAB signaling trend received from mobile station 102 with the RAB signaling trends of sector 114 and 118, rather than with the neighbor list signaling trends of those sectors.

After determining that sector 114 is the intended target sector, at block 308, BTS 104 causes mobile station 102 to be served by sector 114. BTS 104 may effect the handoff to sector 114 by engaging in handoff signaling involving RNC 120, switch 124, RNC 122, and ultimately BTS 112, which radiates to define sector 114. Specifically, BTS 104 may send a handoff request that is received by BTS 112. BTS 112 may then arrange for sector 114 to serve mobile station 102 and send a message to BTS 104 indicating that sector 114 serves mobile station 102. After the handoff to sector 114, mobile station 102 may terminate its operations on serving sector 110 or may proceed to operate on both sector 110 and sector 114.

Figure 4:
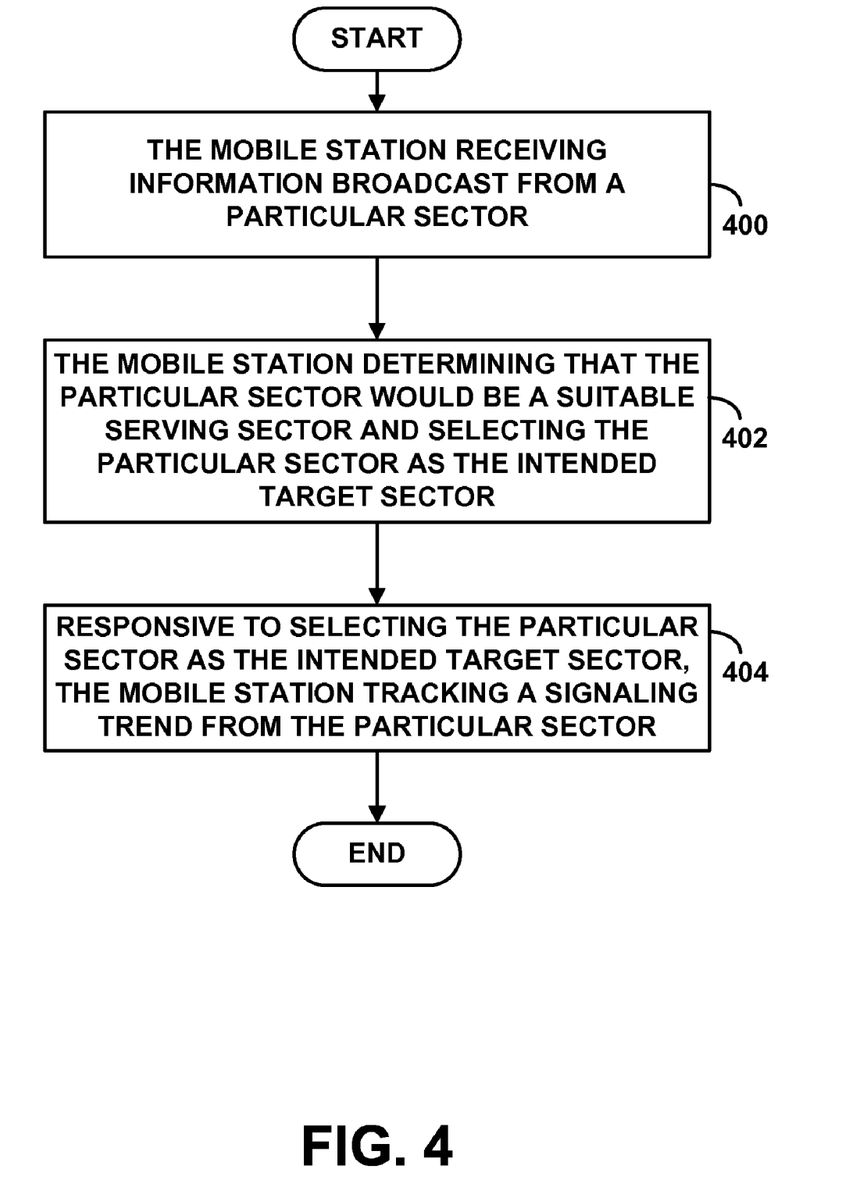
FIG. 4 is a flow chart depicting functions that can be carried out in addition to those depicted in FIG. 3.

FIG. 4 is a flow chart summarizing additional functions that can be carried out by one or more RAN components in accordance with the embodiment of the method depicted in FIG. 3. In particular, the functions depicted in FIG. 4 may be performed before engaging in the functions depicted in FIG. 3. The arrangement of functions shown in FIG. 4 is exemplary and non-limiting. These functions could be re-ordered, combined, divided, or omitted, as appropriate for a particular implementation. For illustrative purposes, reference will be made to the entities and arrangements of FIG. 1 in the discussion of FIG. 4, but it should be understood that other entities and arrangements are possible.

To set the stage for the FIG. 4 discussion, again returning briefly to FIG. 1, mobile station 102 may be currently served by sector 110 radiated by BTS 104. As noted above, all the sectors radiated by BTS 104 (sectors 106, 108, and 110) may have distinct sector identifiers and may be on each other's neighbor lists. Sector 114 may not be on the neighbor list of sector 110, and sector 114 may a sector identifier that is a PN offset of 20 that is not shared by any of sectors 106, 108, 110. Sector 118 may share the sector identifier, a PN offset of 20, with sector 114.

At block 400, mobile station 102 receives information broadcast from a particular sector. For instance, mobile station 102 may receive pilot strength signals from sector 114. At block 402, mobile station 102 determines, based on the strength of the pilot signals from sector 114, that sector 114 would be a suitable serving sector. Mobile station 102 then selects sector 114 as an intended target sector for a handoff request.

At block 404, responsive to selecting sector 114 as the intended target sector, mobile station 102 tracks a signaling trend from sector 114. For example, mobile station 102 may monitor and record RABs broadcast by sector 114 over a set interval, such as tens or hundreds of milliseconds. As another example, mobile station 102 may monitor and record neighbor list messages, access parameter messages, sector parameter messages, or conflict messages from sector 114 over a set interval or until a set number of messages of a particular type are broadcast.

Once mobile station 102 has sufficiently tracked a signaling trend from sector 114, mobile station 102 is ready to make a handoff request. For example, mobile station 102 may request handoff and include in the request the sector identifier of sector 114 and the tracked signaling trend from sector 114. After that request is sent to BTS 104, BTS 104 may engage in the functions beginning at block 300 and described in reference to FIG. 3 above.

Figure 5:
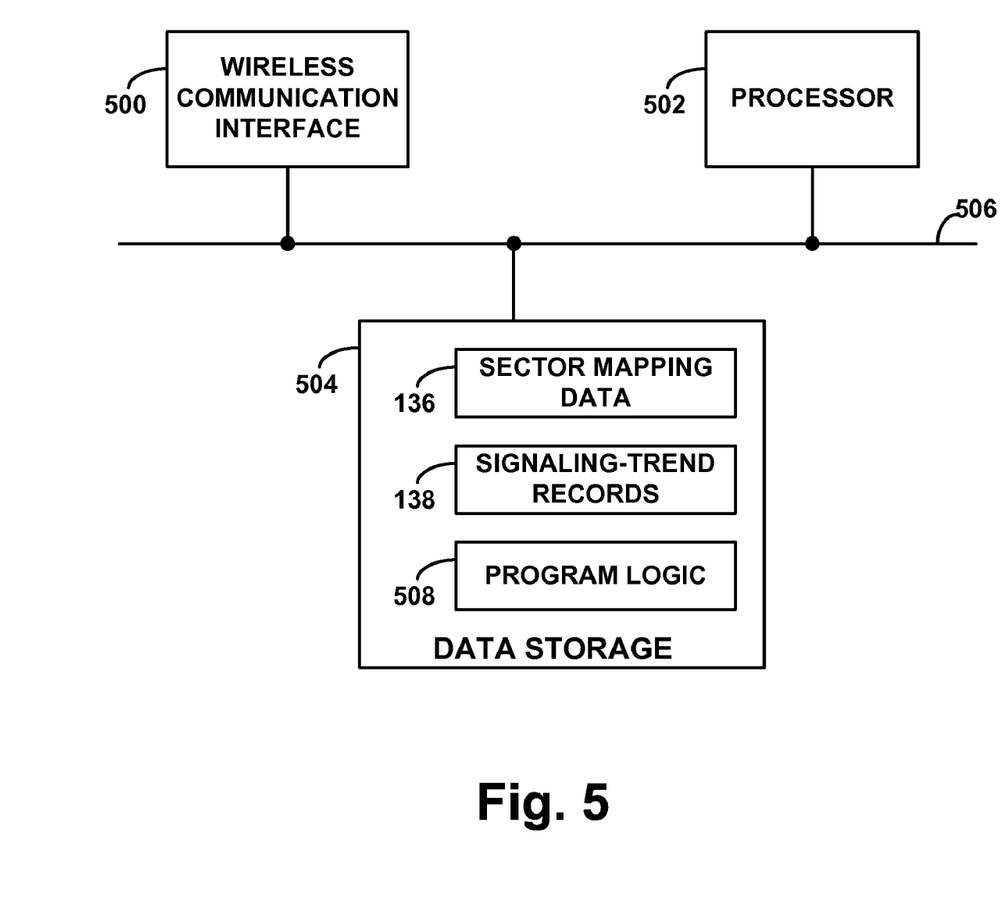
FIG. 5 is a simplified block diagram of a RAN arranged to implement exemplary methods.

FIG. 5 is a simplified block diagram depicting functional components of an exemplary RAN arranged to carry out the method. As shown, the RAN includes a wireless communication interface 500, a processor 502, and data storage 504, all of which may be communicatively linked together by a system bus or other connection mechanism 506. Although FIG. 5 depicts components as discrete boxes, it should be understood that the components can be integrated together or distributed to any extent desired, and that other variations are possible.

Wireless communication interface 500 includes one or more cell site modems, channel elements, power amplifiers, and antenna arrangements, cooperatively working to define and manage one or more sectors for instance in which the RAN can serve mobile stations. Each sector preferably has a respective sector identifier (such as a PN offset or other identifier), which the RAN uses to distinguish communications in the sector from those in adjacent sectors.

Processor 502 comprises one or more general purpose processors or one or more special purpose processors (e.g., digital signal processors, application specific integrated circuits, etc.) Data storage 504, in turn, comprises one or more volatile or non-volatile storage components, such as magnetic, optical, or organic memory components. As shown, data storage 504 may include various data, including sector mapping data 136, signaling-trend records 138, and program logic 508 executable by processor 502 to carry out various RAN functions. In example operation, wireless communication interface 500 receives from a mobile station a connection request that specifies a sector identifier and a signaling-trend record, and passes the request to processor 502. Processor 502 then determines which available sectors have the specified sector identifier, by reference to the sector mapping data 136 for instance or by causing a distance search to be conducted via the wireless interface 500. Also, processor 502 determines which available sector has a signaling-trend record that matches the received signaling-trend, by reference to the signaling-trends records for instance, and designates an available sector with a matching signaling-trend record to be the intended target sector. Processor 502 then assigns the mobile station to communicate with and operate within the intended target sector.

Exemplary embodiments of the methods and systems have been described above. Those of ordinary skill in the art will appreciate, however, that modifications may be made to these embodiments while remaining within the scope defined by the claims.

I claim:

1. A method comprising:
receiving a sector handoff request from a mobile station, wherein the sector handoff request specifies a sector identifier and a signaling trend, wherein the sector identifier identifies an intended target sector, and wherein multiple available sectors are identified by the sector identifier;
accessing a history of signaling-trend records, which are indexed per sector, to determine, based on the received signaling trend, which of the multiple available sectors is the intended target sector; and
responsive to the determination of the intended target sector, causing the mobile station to be served by the intended target sector.

2. The method of claim 1, wherein the signaling trend comprises a sequence of reverse activity bits (RABs) that the intended target sector broadcast and the mobile station recorded.

3. The method of claim 1, wherein at least one source sector serves the mobile station and wherein the at least one source sector has a neighbor list specifying a plurality of neighbor sectors each by a respective sector identifier, the method further comprising:
determining that the sector identifier specified by the received handoff request is not listed by the neighbor list; and
responsive to determining that the sector identifier specified by the received handoff request is not listed by the neighbor list, carrying out the accessing and causing.

4. The method of claim 1, wherein the sector identifier is a pseudorandom-number (PN) offset.

5. The method of claim 1, wherein the mobile station is an Evolution Data Optimized (EV-DO) access terminal.

6. The method of claim 1, wherein the signaling trend comprises a sequence of neighbor list messages that the intended target sector broadcast and the mobile station recorded.

7. The method of claim 1, wherein the signaling trend comprises a sequence of sector parameter messages that the intended target sector broadcast and the mobile station recorded.

8. The method of claim 1, wherein the signaling trend comprises a sequence of access parameter messages that the intended target sector broadcast and the mobile station recorded.

9. The method of claim 1, wherein the signaling trend comprises a sequence of conflict messages that the intended target sector broadcast and the mobile station recorded.

10. The method of claim 1, further comprising conducting a distance search to identify the multiple available sectors.

11. The method of claim 1, wherein the signaling trend comprises (i) a sequence of messages from the intended target sector and (ii) a signaling trend identifier.

12. The method of claim 1, wherein a source sector serves the mobile station, and wherein an entity serving the source sector creates the history of signaling-trend records by tracking and recording signaling trends of various sectors.

13. The method of claim 1, further comprising:
the mobile station receiving information broadcast from a particular sector;
the mobile station determining that the particular sector would be a suitable serving sector and selecting the particular sector as the intended target sector; and
responsive to selecting the particular sector as the intended target sector, the mobile station tracking a signaling trend from the particular sector, wherein the signaling trend specified by the sector handoff request is the tracked signaling trend.

14. The method of claim 1, wherein a base station serving the mobile station performs at least the determining step.

15. The method of claim 1, where the handoff request comprises a channel assignment into soft handoff (CASHO) request message.

16. A method comprising:
receiving from a mobile station a handoff request that identifies an intended target sector by a target sector identifier;
determining that multiple available sectors have the target sector identifier;
responsive to that determination, querying the mobile station for a signaling trend from the intended target sector and receiving the signaling trend in response from the mobile station;
determining, based upon the received signaling trend, which of the multiple available sectors is the intended target sector; and
causing the mobile station to be served by the determined target sector.

17. The method of claim 16, wherein querying the mobile station for a signaling trend associated with the target sector includes setting a time limit for a response.

18. The method of claim 17, further comprising establishing the time limit based on a speed of the mobile station.

19. A radio access network (RAN) comprising:
a plurality of base stations that radiate to define a plurality of sectors;
a processor; and
data storage, wherein the data storage contains instructions executable by the processor for causing the RAN to carry out functions including (i) receiving a sector handoff request from a mobile station, wherein the sector handoff request includes a sector identifier and a signaling trend, wherein the sector identifier and the signaling trend identify an intended target sector, and wherein multiple available sectors in the plurality of sectors have the sector identifier, (ii) accessing a history of signaling-trend records, which are indexed per sector, to determine, based on the received signaling trend, which of the multiple available sectors is the intended target sector; and (ii) responsive to the determination of the intended target sector, causing the mobile station to be served by the intended target sector.

20. The system of claim 19, wherein the signaling trend comprises a sequence of reverse activity bits (RABs) that the intended target sector broadcast and the mobile station recorded.

\* \* \* \* \*